Figure 1:
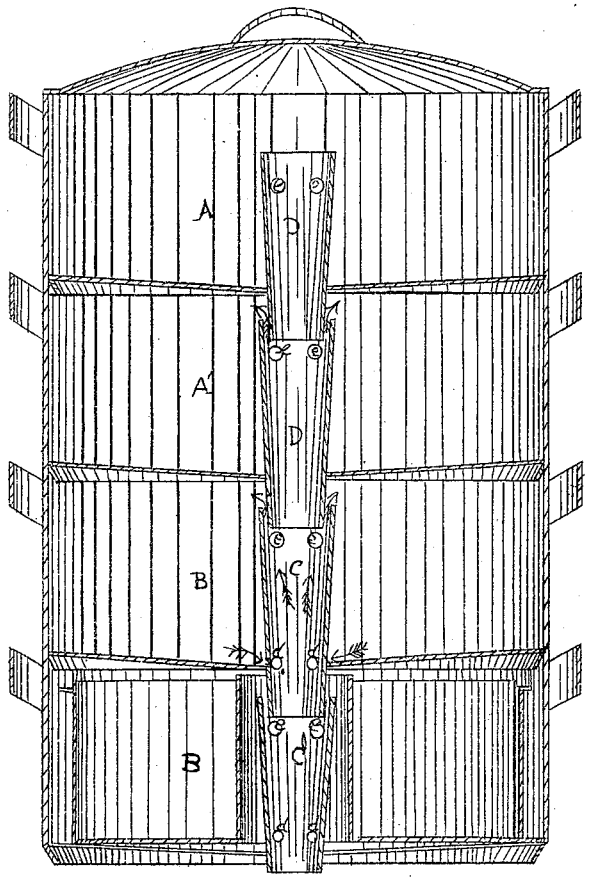

PATENTED
NOV 26 1867
M. C. Cronk's Steamer for Cooking Vegetables & Meats.

71284

Witnesses: Jno. A. Ellis, H. R. Wright

Inventor: M. C. Cronk
Per J. H. Alexander
Atty's

UNITED STATES PATENT OFFICE.

M. C. CRONK, OF AUBURN, NEW YORK.

IMPROVEMENT IN STEAMERS FOR COOKING.

Specification forming part of Letters Patent No. 71,284, dated November 26, 1867.

*To all whom it may concern:*

Be it known that I, M. C. CRONK, of Auburn, in the State of New York, have invented certain new and useful Improvements in Steamers for Cooking Vegetables and Meat; and I hereby declare that the following is a true, full, and exact description of the same, reference being had to the accompanying drawings, and to the letters of reference marked thereon.

In the annexed drawings, which make a part of this specification, Figure 1 represents a vertical section of my steamers.

My invention consists in the construction and arrangement of a series of steam-vessels, in the manner hereinafter described.

The letters A A' and B B' represent four colander-shaped steamers, each having a flange at bottom to fit into the top of the one beneath it. D D' and C C' represent a number of tubes corresponding with the number of steamers, each of said tubes being made to pass through the bottom of its respective steamer at its center, and to extend below said bottom sufficiently far to enter the top of the tube directly below it, each tube being made larger at top than at bottom. The two steamers C and C' are provided with perforations $d\ d$, through which the steam after being condensed will return into the tubes C and C', and be conveyed back into the kettle or generator on which my apparatus is placed.

As one of the objects of my invention is to cook vegetables apart, so that there need not be any intermingling of flavor, the two steamers A and A' are without the openings $d\ d$ near the bottom of tubes C and C', so that the steam which enters steamers A and A' when condensed cannot return again into the tubes D and D', and thus be conveyed into the generator below, in which the meat is placed.

The advantages of my apparatus are twofold: first, the cooking of any number of vegetables without any intermingling of flavors; second, by putting neither meat nor vegetables into the steam-generator, a supply of hot water is always in readiness for making coffee or tea. To effect this object, the steamers B and B' must be removed, and steamers A and A' placed over the steam-generator.

Having thus described my invention, what I claim, and desire to secure by Letters Patent, is—

So constructing and arranging the tubes which pass through the several steamers that various kinds of vegetables or meats may be cooked simultaneously without the fumes intermingling, as described.

In testimony that I claim the above as my own I hereby affix my signature in the presence of two witnesses.

M. C. CRONK.

Witnesses:
F. G. DAY,
EDSON E. PHELPS.